Figures 1, 2:
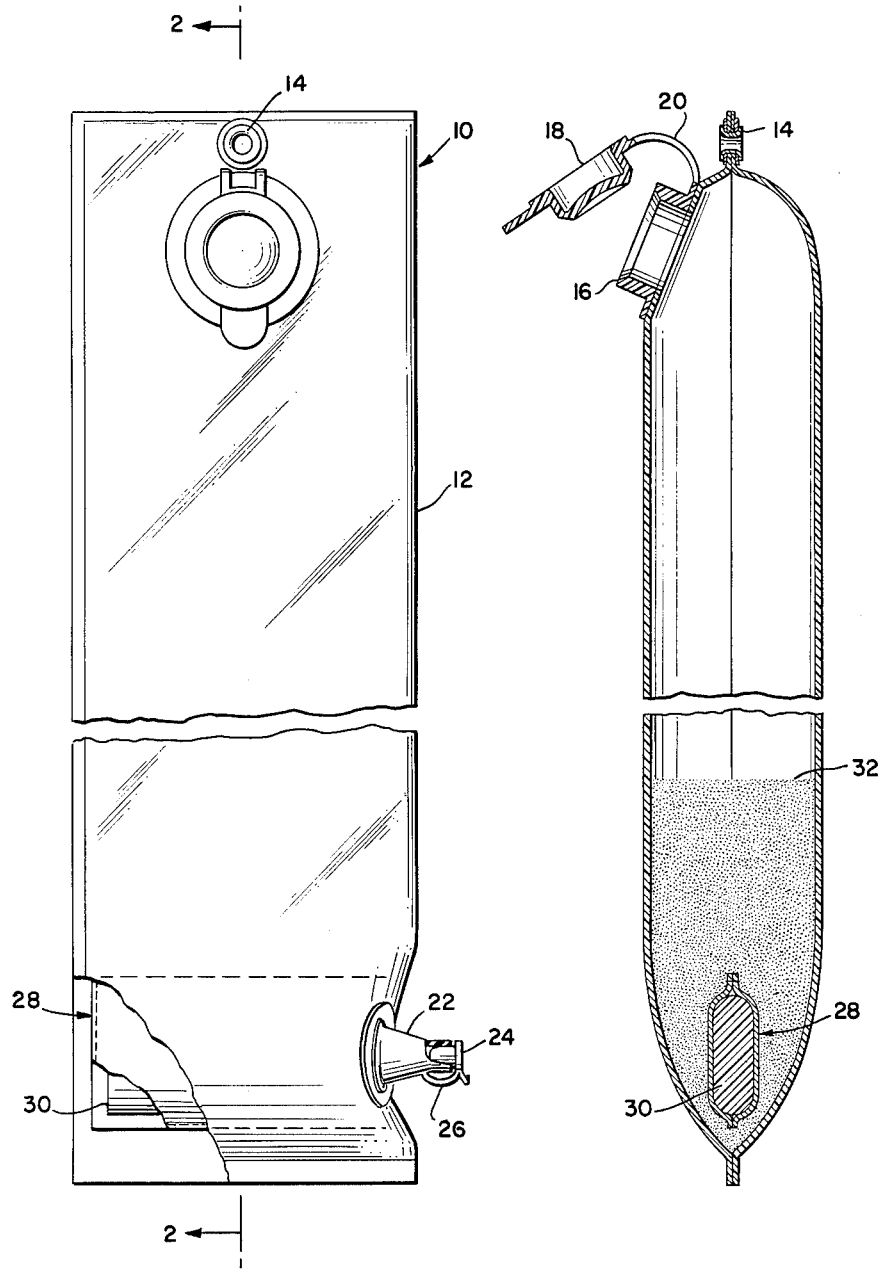

United States Patent Office 3,223,619
Patented Dec. 14, 1965

---

3,223,619
RADIOACTIVE FALLOUT TREATMENT KIT
Calvin Calmon, Birmingham, Martin E. Gilwood, Princeton, and John P. Termini, Levittown, N.J., assignors to Pfaudler Permutit Inc., Birmingham, N.J., a corporation of New York
Filed Feb. 21, 1962, Ser. No. 174,847
8 Claims. (Cl. 210—24)

This invention relates to a water-treatment device and composition and more particularly relates to a device and composition for rendering potable, water which has been contaminated with nuclear fission products and other contaminants. It also relates to a novel method for removing such fission products and other contaminants from water.

In the event of atomic or nuclear attack, it is likely that the usual sources of drinking water will be polluted by radioactive fallout materials. Also, the usual facilities for purifying drinking water are likely to be damaged so that water which is available for consumption will contain not only nuclear materials, but chemical and bacteriological pollutants as well.

The three major components of radioactive fallout materials are strontium 90, which tends to settlet in human bones and produce leukemia, cesium 137, which finds its way into the general body tissue and tends to produce cancer, and iodine 131, which tends to concentrate in the thyroid gland and produce cancer.

The United States Office of Civil Defense has adopted emergency- standards for radioactivity limits for safe drinking water that would require approximately 50% to 85% reduction of radioactive material under anticipated conditions after the first day of fallout. The Office of Civil Defense estimates that each individual will require 2 quarts of water per day and that the period of immobilization, or heavy fallout concentration in water supplies, will last for about 14 days. At present, no efficient means for purifying water exists which meets the Civil Defense standards and which is also compact, reliable and lightweight, which is convenient in manipulation, and which is convenient for storage in the usual civilian fallout shelter, whether of family or community size.

It is an object of this invention to provide a water-treatment device, composition and method for rendering potable water that has been contaminated with chemical, bacteriological and radioactive pollutants.

It is another object of this invention to provide an emergency water-treatment device which is compact, reliable, lightweight, efficient, convenient in manipulation and which occupies a minimum of storage space.

A further object of this invention is to provide a fallout water treatment kit which will be sufficient to treat a supply of water for one individual for the duration of a fallout emergency.

Other objects will be apparent to those skilled in the art from reading the following description, taken in conjunction with the drawings in which:

FIGURE 1 is an elevational view of a device embodying the invention and shown in the closed position; and FIGURE 2 is a section view of the same device taken along line 2—2 but shown with the fill spout open.

As shown in FIGURES 1 and 2, the device comprises a container shown generally at 10, which is formed by a tube 12, sealed at top and bottom so as to be watertight. The tube may be made of any pliable plastic material, such as plasticized polyvinyl chloride. The material of the tube should be sufficiently thick to withstand the manipulation of the tube during use, yet remain pliable and easy to manipulate. Plasticized polyvinyl chloride tubing having a thickness of 6 to 15 mils is preferred, although other materials and thicknesses which meet the required conditions may be used. The container may be provided with a grommet 14, at the top in order to provide a convenient means for hanging the device during use. The container has fill spout 16, which may be of heavy semi-rigid plastic material, such as plasticized polyvinyl chloride, and which is sealed into tube 12. Fill spout 16 has a friction stopper 18, connected to it by band 20.

Outlet spout 22, which may be of heavy semi-rigid plastic material, such as plasticized polyvinyl chloride, is sealed into tube 12, adjacent the bottom of container 10. Outlet spout 22, has a friction stopper 24, connected to it by band 26. Container 10 is watertight when stopper 24 and stopper 18 are in the closed position. Disposed inside the container is filter element 28, which is comprised of filter cloth having a mesh composed of about 30 threads per inch which in a swollen condition has a mesh opening of approximately 10 microns and which further has disposed within it expansion material 30 which may be, for instance, open cell polyurethane foam. The expansion material serves as a structural member for maintaining the shape of filter element 28. The filter element is permanently connected to the outlet spout 22, so that the materials within the container must pass through the filter element before leaving the container through the outlet spout.

Included within container 10 is the treatment composition 32. The treatment composition may consist of finely-divided particulate material preferably about 300 to 600 microns in size, or small pellets up to one inch in the largest dimension. In order to carry out the pelletizing, 0.5% by weight of stearic acid must be added to the ingredients of the treatment composition for lubricant purposes.

In operation the stopper 24, is securely fastened in outlet spout 22. The stopper 18, is removed from fill spout 16, and contaminated water is charged into the container 10. The stopper 18, is then securely replaced in fill spout 16, forming a completely watertight container. Container 10 is then shaken until the treatment composition is freely suspended in the water, thus bringing the water and treatment composition into intimate contact. The container is shaken intermittently for a total of at least five minutes over a thirty minute period. After thirty minutes stopper 18 is removed from fill spout 16; stopper 24 is removed from the outlet spout 22, and the treated water is permitted to drain through filter element 28, out of outlet spout 22 and directly into the mouth of the user or into a suitable receptacle, not shown. If necessary, stopper 18 may be replaced in fill spout 16, and tube 12 carefully squeezed to force out any remaining water. Should the first portion of the water removed after treatment be cloudy, it may be returned to the container through fill spout 16, for additional purification and filtration. Immediately after emptying the device of one batch of purified water, the device is in suitable condition to treat another batch of contaminated water. Alternatively, the contaminated water may be treated in increments of 1 quart using a smaller quantity of powdered material or pellet for each treatment. The treatment composition could be discarded after each quart of treatment or retained in the treatment bag until several quarts have been treated and then discarded.

The treatment composition consists of materials which are capable of removing radiological contaminants such as strontium 90, cesium 137 and iodine 131 and other dissolved and suspended contaminants. Additionally, the treatment composition may contain materials which are capable of removing undesirable taste and odor, and toxic chemical agents. Filter materials and clarifying agents may also be included among the treatment ingredients. The device of the invention is effective to remove as much as 99% of fall out components, suspended solids and up to 300 parts per million (p.p.m.) of dissolved solids.

Among the essential ingredients are a demineralization combination of an anion and a cation exchange resin. The anion exchange resin removes iodine 131 and other anions. The cation exchange resin removes strontium 90 and some cesium 137, as well as other cations. Among the anion exchange resins which may be employed in producing the desired result are those of weakly basic or strongly basic types, many of which are available commercially. Among the weakly basic anion exchange resins are those which are described in U.S. Patents 2,151,833; 2,223,930; 2,251,234; 2,366,008 and 2,388,235. An example of a strongly basic anion exchange resin is that produced in accordance with U.S. Patents 2,469,683 and 2,610,156. Patent No. 2,469,683 describes copolymers of an epihalohydrin and a polyalkylene polyamine.

Another type of ion exchange resin which is satisfactory is that which is prepared by chloromethylating an insoluble copolymer of a monovinyl aromatic hydrocarbon and a divinyl aromatic hydrocarbon or divinyl aliphatic ester (such as divinylbenzene or ethylene glycol dimethacrylate, respectively), and then reacting the chloromethylated copolymer with a primary, secondary or tertiary amine. The resulting aminated product may then be desirably quaternized to produce a quaternary ammonium anion exchanging substituent which is highly basic and which is capable of splitting neutral salts, such as sodium chloride. Specific examples of the anion exchange resins which may be employed include the strongly basic quaternary ammonium anion exchange resin produced by aminating with trimethyl amine or dimethyl ethanolamine, a chloromethylated copolymer of about 94% styrene and 6% ethylene glycol dimethacrylate. Another specific anion exchange resin which may be employed is that produced by polymerizing epichlorohydrin in a proportion of 3 moles to 1 mole of tetraethylenepentamine.

Among the cation exchange resins which may be employed in the present invention are those of the sulfonic acid and carboxylic acid types. These materials are readily available commercially. Such cation exchange resins include the sulfonated phenol-aldehyde products such as are described and discussed in U.S. Patents 2,184,943; 2,228,159; 2,228,160; 2,230,641; 2,259,455; 2,319,359 and 2,361,754. Of particular interest are the sulfonated polymers of styrene crosslinked with divinylbenzene such as are described in U.S. Patent No. 2,366,007. The carboxylic type cation exchange resins include those described in U.S. Patents 2,340,110 and 2,340,111. An example of the carboxylic resin is that produced by suspension polymerization of a mixture consisting of 5% divinylbenzene and 95% methacrylic acid. An example of the sulfonated type cation exchange resin is that produced by sulfonating with concentrated sulfuric acid, a copolymer of 90 parts of styrene and 10 parts of divinylbenzene.

A third essential ingredient of the treatment composition is a filter-aid which may be a short grained sulfite pulp cellulose, such as Solka-Floc which has a particle size of from 40 to 165 microns. Alternatively, diatomaceous earth may be used as a filter-aid. The filter-aid removes solid materials from the contaminated raw water.

Another essential ingredient of the treatment composition is a clarifying agent which serves to clear the water and remove chemical toxic agents. Ferric phosphate is a preferred clarifying agent, but other compounds may be used as well, such as apatite, tricalcium phosphate, ferric hydroxide, ferric oxide or activated alumina.

In addition to the above, activated carbon may be incorporated with the treatment composition to remove undesirable taste and odor from the water and absorb some of the radiological contamination, as well as some of the toxic chemical agents. Bonechar may be used in place of the activated carbon.

In addition to the foregoing, it is desirable to use sodium aluminosilicate as an ingredient of the treatment composition to assist in the removal of radioactive cesium. The sodium aluminosilicate may desirably have a composition of one part $Na_2O$, to one part $Al_2O_3$ to 2.5 parts of $SiO_2$. The sodium aluminosilicate may be replaced with montmorillonite, clinoptilolite, ammonium phosphomolybdate, zirconium phosphate, activated bentonite or other high surface ion exchange clays.

The amounts of the treatment ingredients used can vary greatly, there being no criticality in the amount used.

In order more clearly to disclose the nature of the present invention, the following examples are presented. It should be understood, however, that this is done solely by way of example and is intended neither to delineate the scope of the invention nor limit the ambit of the appended claims.

*Example I*

A container of the type shown and described was charged with 70 grams of a strongly basic quaternary ammonium anion exchange resin prepared by aminating with trimethylamine, a chloromethylated copolymer of 95% styrene and 5% ethylene glycol dimethacrylate which had an average particle size of about 600 microns. Also charged into the container were 67 grams of ground, strong acidic cation exchange resin consisting of a sulfonated copolymer of 90 parts of styrene and 10 parts of divinylbenzene made in accordance with U.S. Patent No. 2,366,007. Solka-Floc, a comminuted, purified wood pulp having a particle size of from 40 to 165 microns, in the amount of 0.5 grams was added to the container. Also added were 1.0 gram of ferric phosphate, 15 grams of activated carbon and 5.6 grams of sodium aluminosilicate. The container into which had been added the foregoing ingredients of the treatment composition was then ready to treat water having radioactive and other contaminants.

To the charged container a quart of water containing $10^{-3}$ micro-curies of mixed fission product per milliliter were charged. The container was manipulated by the procedure described above and the purified product recovered and analyzed. The purified product contained $3.1 \times 10^{-7}$ micro-curies of mixed fission product per milliliter of water. This demonstrated a decontamination factor of 3200 and amounted to 99.97% removal of radioactive materials.

Successive treatments of 29 additional quarts of similarly contaminated water were carried out. The purified product from the treatment of the thirtieth quart of contaminated water was analyzed and found to contain $6.9 \times 10^{-6}$ micro-curies of mixed fission product per milliliter of water. The purity amounted to a removal of 99.31% of the radioactive material from the thirtieth quart, and demonstrated a decontamination factor of 145.

Example II

The charge of treatment ingredients in Example I was intended to be suitable for the treatment of a 14 day supply of water for a person consuming 2 quarts of water a day or a total treatment of 28 quarts of water. A test of the effectiveness of the treatment of lesser amounts of contaminated water with reduced amounts of treatment ingredients was carried out according to the following procedure. One twenty-eighth of the amounts of the treatment ingredients of Example I was charged into a container and a quart of contaminated water used in Example I was added. At the end of the treatment period, 97.43% of the radioactive material had been removed with a corresponding decontamination factor of 38.9.

Example III

The treatment ingredients described above are effective to remove radioactive materials and chemical contaminants as well as clarifying water, removing undesirable taste and odor and destroying some bacteria. However, additional treatment is required to remove all of the bacteria. Preferably, a post-treatment of the purified water with Halozone (p-sulfondichloramidobenzoic acid), by a well-known method is accomplished. However, if it is desirable, the bacteriological purification can be carried out during the chemical and radiological purification. The purification may be accomplished by adding 7.5 grams of an insoluble silver salt contained in a small cloth or suitable paper bag which is inserted into the container along with the other treatment ingredients. The insoluble silver salt may also be added in the container by being placed in the filter element 28, at the base of the container.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A treatment device for rendering potable, water contaminated with radioactive fission products and toxic chemical agents comprising a pliable watertight container and a treatment composition disposed within said container, said treatment composition comprising an anion exchange resin selected from the class consisting of strongly basic anion exchange resins, and weakly basic anion exchange resins; a cation exchange resin selected from the class consisting of sulfonic acid resins and carboxylic acid resins; a filter aid selected from the class consisting of comminuted cellulose and diatomaceous earth; and a clarifying agent selected from the class consisting of ferric phosphate, apatite, tricalcium phosphate, ferric hydroxide, ferric oxide and activated alumina.

2. A device according to claim 1 further comprising as a component of the treatment composition an additional purifying agent selected from the class composed of activated carbon and bonechar.

3. A device according to claim 1 further comprising as a component of the treatment composition an additional purifying ingredient selected from the class consisting of montmorillonite, clinoptilolite, ammonium phosphomolybdate, zirconium phosphate, activated bentonite, high surface ion exchange clays, and sodium aluminosilicate, wherein said sodium aluminosilicate is composed of one part $Na_2O$, one part $Al_2O_3$ and 2.5 parts $SiO_2$.

4. A method for rendering potable, water contaminated with radioactive fission products and toxic chemical agents comprising disposing inside a pliable watertight container a treatment composition comprising an anion exchange resin selected from the class consisting of strongly basic anion exchange resins and weakly basic anion exchange resins, a cation exchange resin selected from the class consisting of sulfonic acid resins and carboxylic acid resins, a filter aid selected from the class consisting of comminuted cellulose and diatomaceous earth, and a clarifying agent selected from the class consisting of ferric phosphate, apatite, tricalcium phosphate, ferric hydroxide, ferric oxide and activated alumina; adding the contaminated water to the container; and shaking the container to bring the water and treatment composition into intimate contact.

5. A treatment device for rendering potable, water contaminated with radioactive fission products and toxic chemical agents comprising a pliable watertight container and a treatment composition disposed within said container, said treatment composition comprising an anion exchange resin selected from the class consisting of strongly basic anion exchange resins and weakly basic anion exchange resins; a cation exchange resin selected from the class consisting of sulfonic acid resins and carboxylic acid resins; a filtered aid selected from the class consisting of comminuted cellulose and diatomaceous earth; a bactericide comprising an insoluble silver salt; and a clarifying agent selected from the class consisting of ferric phosphate, apatite, tricalcium phosphate, ferric hydroxide, ferric oxide and activated alumina.

6. A method for rendering potable, water contaminated with radioactive fission products and toxic chemical agents comprising disposing inside a pliable watertight container a treatment composition comprising an anion exchange resin selected from the class consisting of strongly basic anion exchange resins and weakly basic anion exchange resins, a cation exchange resin selected from the class consisting of sulfonic acid resins and carboxylic acid resins, a filter aid selected from the class consisting of comminuted cellulose and diatomaceous earth; a bactericide comprising an insoluble silver salt; and a clarifying agent selected from the class consisting of ferric phosphate, apatite, tricalcium phosphate, ferric hydroxide, ferric oxide and activated alumina; adding the contaminated water to the container; and shaking the container to bring the water and treatment composition into intimate contact.

7. Apparatus for rendering potable, water contaminated with radioactive fission products, toxic chemical agents and bacteria comprising a collapsible elongated sealed tube of pliable plastic material, a sealable fill spout mounted in said tube adjacent one end, a sealable outlet spout mounted in said tube adjacent the other end, a filter element disposed with said tube and fixedly connected to said outlet spout, said filter element further comprising a porous core and a filter cloth disposed about said core; and a treatment composition disposed within said tube, said treatment composition comprising an anion exchange resin selected from the class consisting of strongly basic anion exchange resins and weakly basic anion exchange resins; a cation exchange resin selected from the class consisting of sulfonic acid resins and carboxylic acid resins; a filter aid selected from the class consisting of comminuted cellulose and diatomaceous earth; a bactericide comprising an insoluble silver salt; and a clarifying agent selected from the class consisting of ferric phosphate, apatite, tricalcium phosphate, ferric hydroxide, ferric oxide and activated alumina.

8. A composition for rendering potable, water contaminated with radioactive fission products and toxic chemical agents comprising an anion exchange resin selected from the class consisting of strongly basic anion exchange resins and weakly basic anion exchange resins; a cation exchange resin selected from the class consisting of sulfonic acid resins and carboxylic acid resins; a filter aid selected from the class consisting of comminuted cellulose and diatomaceous earth; a clarifying agent selected from the class consisting of ferric phosphate, apatite, tricalcium phosphate, ferric hydroxide, ferric oxide and activated alumina; and an additional purifying ingredient selected from the class consisting of montmorillonite, clinoptilolite, ammonium phosphomolybdate, zirconium phosphate, activated bentonite, high surface ion exchange clays, and sodium aluminosilicate, wherein said sodium aluminosilicate is composed of one part $Na_2O$, one part $Al_2O_3$ and 2.5 parts $SiO_2$.

References Cited by the Examiner

UNITED STATES PATENTS

| | | | |
|---|---|---|---|
| 1,834,045 | 12/1931 | Breuil | 210—282 |
| 2,515,142 | 7/1950 | Stroh | 210—24 |
| 2,766,204 | 10/1956 | Lowe | 210—53 |
| 3,017,347 | 1/1962 | Kratz | 210—63 |
| 3,080,971 | 3/1963 | Hutto et al. | 210—75 |

OTHER REFERENCES

Morton et al., "Removal of Radionuclides From Waters by Water Treatment Processes" American Water Work Association. Journal, vol. 48, January–June 1956, pp. 545–558 relied upon.

Swope, "Processing Liquid Radioactive Wastes at Argonne." Water Pollution Control Federation. Journal, vol. 33, July–December 1961, pages 871–880.

MORRIS O. WOLK, *Primary Examiner*.